United States Patent [19]

Etra

[11] 3,732,547

[45] May 8, 1973

[54] TRAFFIC DATA GATHERING APPARATUS

[75] Inventor: Richard Henry Etra, New York, N.Y.

[73] Assignee: Bell Telephone Laboratories, Incorporated, Murray Hill, N.J.

[22] Filed: June 28, 1971

[21] Appl. No.: 157,410

[52] U.S. Cl. ....................340/172.5
[51] Int. Cl. ....................G06f 3/04
[58] Field of Search ....................340/172.5

[56] References Cited

UNITED STATES PATENTS

| | | | |
|---|---|---|---|
| 3,546,678 | 12/1970 | Callaway | 340/172.5 |
| 3,027,550 | 3/1962 | Lee | 340/172.5 X |
| 3,588,837 | 6/1971 | Rash | 340/172.5 |
| 3,099,819 | 7/1963 | Barnes | 340/172.5 |
| 3,231,866 | 1/1966 | Goetz | 340/172.5 |
| 3,322,940 | 5/1967 | Barker | 340/172.5 X |
| 3,344,406 | 9/1967 | Vinal | 340/172.5 |
| 3,623,019 | 11/1971 | Groth | 340/172.5 |

*Primary Examiner*—Paul J. Henon
*Assistant Examiner*—Sydney R. Chirlin
*Attorney*—R. J. Guenther et al.

[57] ABSTRACT

A portable traffic data gathering apparatus employs a recirculating memory and common scanning and control circuitry for accumulating both peg count and usage data in a form suitable for transmission to a central point for processing by electronic data processing equipment. Dynamic and static storage are interleaved in the memory to permit the accumulation of one period of data concurrently with the transmission of a previously accumulated period of data. Peg count is obtained by comparing current scan with previous scan, the previous scan or last look memory being stored as part of each data word. The last look memory is also used for input noise filtering, three successive data appearances being required before a count is made. Usage is obtained by scaling down the peg count scans using part of the dynamic and static data words. Detection and correction circuitry minimizes problems due to recirculating memory shifting malfunction.

11 Claims, 7 Drawing Figures

INVENTOR
R. H. ETRA
BY A. E. Snedeker
ATTORNEY

TRAFFIC DATA GATHERING APPARATUS

BACKGROUND OF THE INVENTION

This invention relates to equipment monitoring and data gathering apparatus and more particularly to high speed electronic traffic data gathering apparatus.

Analysis of the various factors and conditions affecting business operation requires the accumulation of large quantities of statistical data. In the telephone industry, for example, studies are conducted regularly to accumulate data with regard to telephone equipment utilization. Interpretation of the accumulated data facilitates the proper assignment and disposition of the various telephone lines and equipment, determines the quantities of equipment necessary to handle given volumes of telephone traffic, and provides for further planning with regard to problem telephone equipment requirements. Thus, sufficiency of present units of equipment may be determined, units may be reallocated to areas of greater need, additional units may be allotted, and the number of circuits between central offices may be altered, or other appropriate action taken, to provide optimal service consistent with overall economy of operation.

The data obtained in these traffic studies may take various forms, but it is principally of two types. One of these types of data relates to traffic volumes, or "peg counts," and provides information on how many calls were made or how often a particular unit of equipment was used in a given period of time. This type of traffic data may be obtained by connecting monitoring equipment to the various units of telephone equipment to be observed and registering an indication upon the seizure or release of the unit of equipment. No regard is given to the length of time the equipment is seized or used, but only to the total number of seizures. Peg count data is necessarily obtained therefore on a random basis.

The other type of data obtained from traffic studies relates to traffic density or percentage usage of the various units of equipment. This usage data may be obtained, for example, by repeatedly scanning the various units of equipment at regular intervals and registering indications of whether the individual units of equipment are seized or in use at the time of the scan. By assuming that a seizure or busy condition which is present at the time of the scan exists for the interval between successive scans, then each indication registered is indicative of a precise period of usage of the individual unit being observed. Proper selection of the scanning interval provides the usage data in standard units of traffic measurement. For example, a scanning rate of 36 scans per hour produces usage indications in terms of hundred-call-seconds (CCS).

Before the accumulated statistical data can be of practical use, heretofore considerable time and energy have been required in compiling, interpreting and summarizing such data. The time and effort required in processing the data to place it in a more readily usable form necessarily limits the quantity of data that can be accumulated and processed economically. Further, manual and clerical manipulations of the data have been a major source of error therein. Therefore, it is desirable to accumulate the data in a form suitable for processing automatically by centralized data processing equipment.

SUMMARY OF THE INVENTION

It is therefore an object of this invention to provide an improved traffic data gathering apparatus for accumulating both peg count and usage data in a form suitable for automatic processing thereof.

A further object of this invention is to provide a portable data gathering apparatus suitable for economical use with small numbers of data gathering points at remote locations.

Another object of this invention is to provide a data gathering arrangement which may be polled remotely for nondestructive data readout concurrently with the gathering of further data.

Yet another object of this invention is to provide a simple, compact and economical data gathering arrangement suitable for integrated circuit fabrication.

In accordance with an illustrative embodiment of the invention, the above and other objects are attained in an arrangement having a recirculating memory and common circuitry utilized for periodic scanning of data gathering points to accumulate both peg count and usage data for transmission to a central location for processing. Dynamic and static storage are provided in the memory to permit the accumulation of one period of data concurrently with the readout and transmission of a previously accumulated period of data. According to one aspect of the invention, the dynamic data words are interleaved in the memory with the static data words, with each pair of adjacent static and dynamic data words deriving from the same data gathering point. Peg count data is obtained by comparing the status of a data gathering point during the current scan with the status thereof during a previous scan, the previous scan status being stored in a "last look" memory advantageously provided as a part of the static and dynamic data word pair deriving from the particular point.

The last look memory is also used according to the invention for input noise filtering, for example, to eliminate the effects of contact chatter or noise spikes. This is particularly important in the gathering of peg count data deriving from relay contact closures, typically the situation in the case of telephone equipment traffic studies. To minimize the possibility of erroneous data counts, the last look memory is employed as a counter, presence of the data input at a gathering point for a predetermined number of successive scans being required before a data count is made.

According to another aspect of the invention, usage data is obtained by scaling down the peg count scans, advantageously using a portion of the static and dynamic data word pair as a multiple decade counter for this purpose. For example, assuming that usage data is desired in the usual CCS units or alternate scan CCS units, the data obtained at the regular scan rate may be scaled down accordingly to correspond to approximately 36 or 18 scans per hour, respectively. Additionally, by varying the scaling factor, the usage data can be gathered from multipled inputs in varying group sizes, a desirable advantage in many applications.

A further aspect of the invention is directed to minimizing erroneous data which might arise due to loss of correspondence between the memory word locations and the data gathering points being scanned. A single data word pair in memory is dedicated to a checking sequence which is matched bit-by-bit for correct correspondence during each memory cycle. Should a mismatch occur, the memory is automatically shifted on an incremental basis until correct correspondence with the scanning is obtained.

BRIEF DESCRIPTION OF THE DRAWING

The above and other objects and features of the invention may be fully apprehended from the following detailed description and the accompanying drawing, in which:

FIG. 1 is arranged to the left of FIG. 2, comprise a block diagram of an illustrative embodiment of traffic data gathering apparatus in accordance with the principles of my invention;

DETAILED DESCRIPTION

Figure 1:
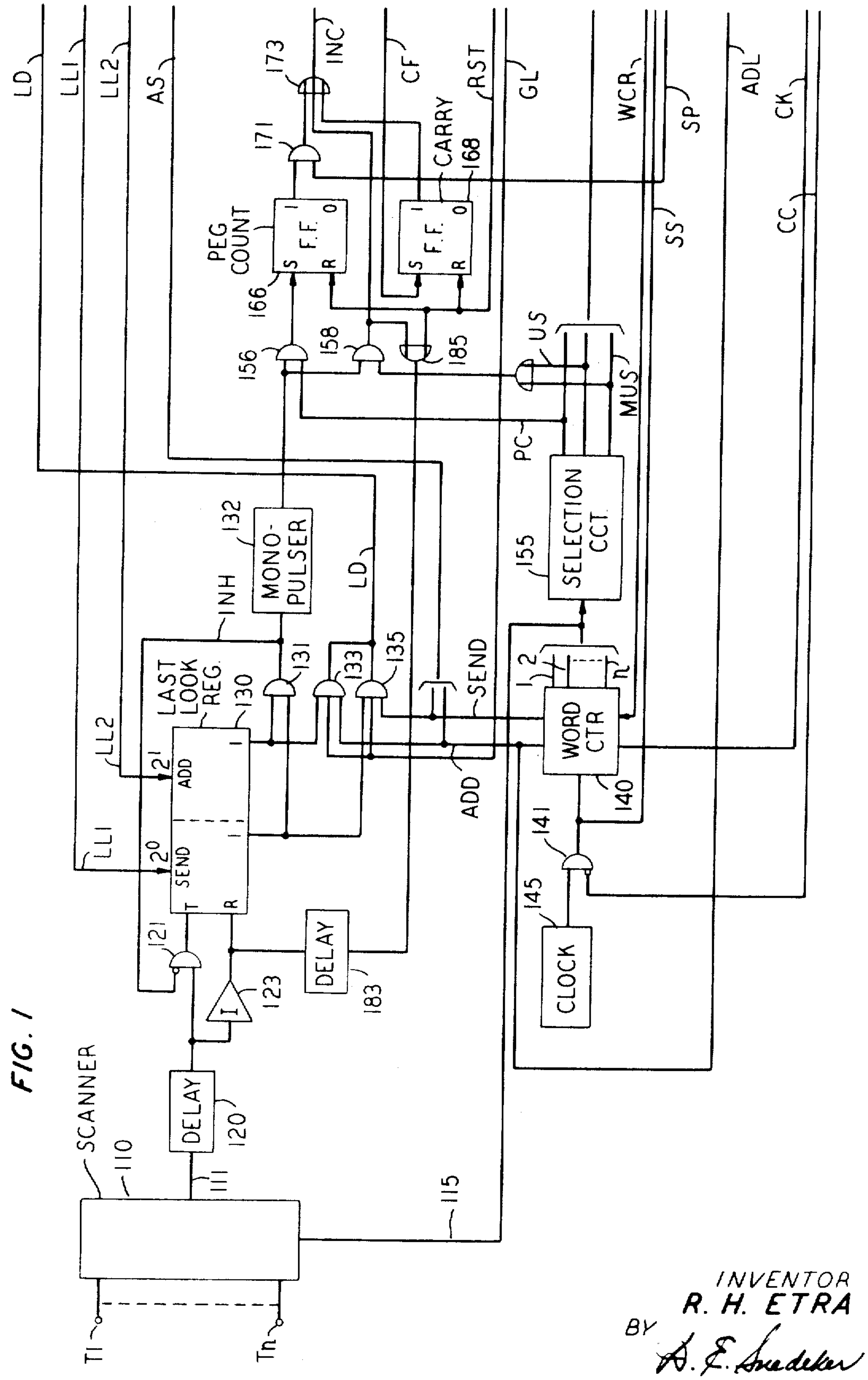
FIGS. 1 and 2, when

The illustrative arrangements of the drawing and the following description are directed toward equipment monitoring and data gathering apparatus for accumulating statistical traffic data from a plurality of data gathering points. It will be appreciated, however, that my invention may be employed to advantage also in a wide range of data gathering applications, particularly those requiring the "funneling" of data from a plurality of sources to a single registering or recording apparatus. For example, my invention may be utilized to monitor telephone message unit indications for billing purposes, or to monitor indications in various telemetering applications for billing or statistical purposes, such as in time-shared computer facilities.

Figure 2:
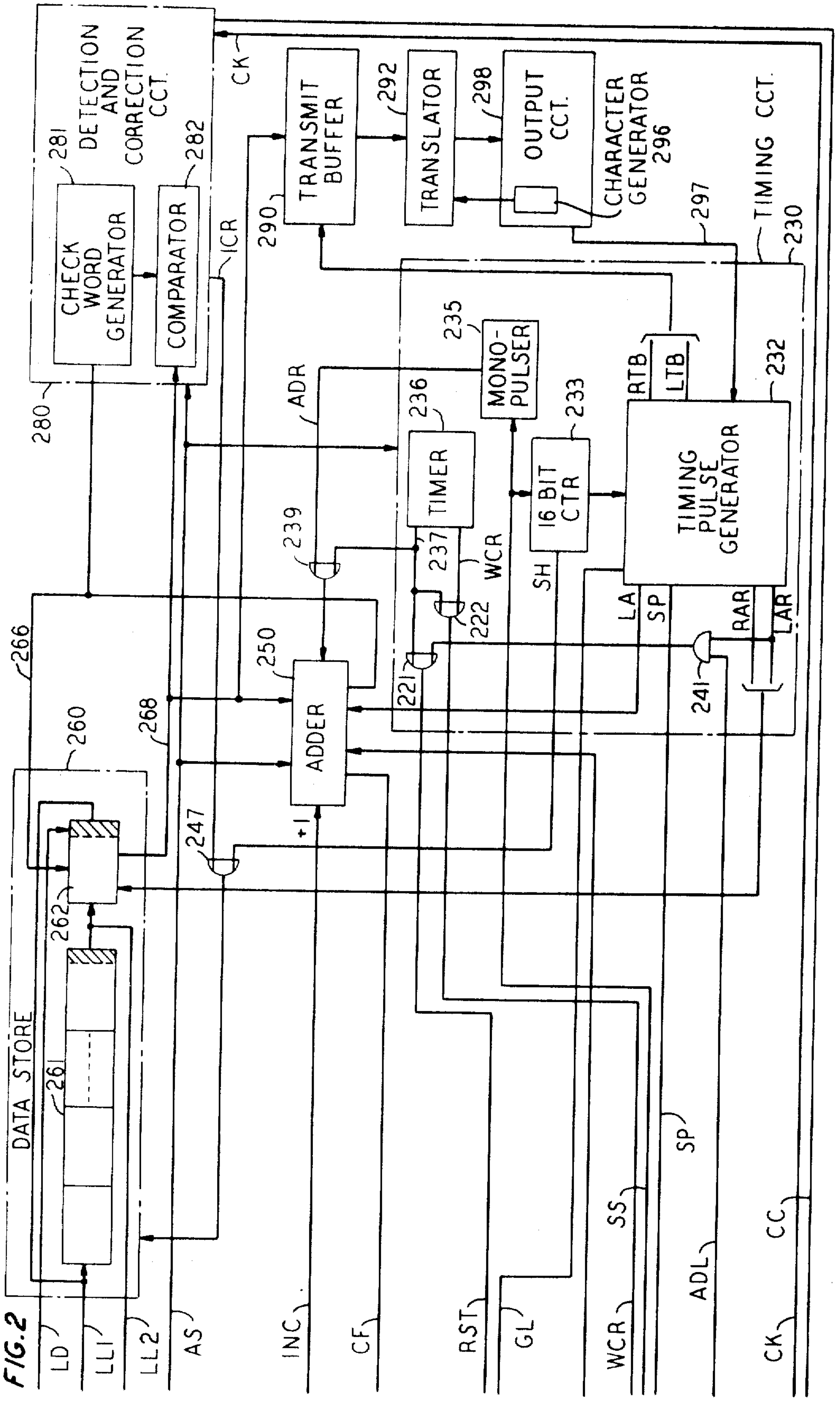

Reference is now made to FIGS. 1 and 2 of the drawing wherein, when FIG. 1 is arranged to the left of FIG. 2, is depicted an illustrative embodiment of traffic data gathering apparatus employing the principles of my invention. The illustrative embodiment depicted is an arrangement for gathering both peg count and traffic usage indications from a plurality of equipment units (not shown) connected to individual ones of data gathering points T*l* through T*n*. For example, each of the equipment units connected to points T*l* through T*n* may comprise individual telephone trunk circuits or groups of trunk circuits and the condition to be monitored may be one of seizure for use. The seizure of an equipment unit, it will be assumed, provides a distinctive indication at the data gathering point T*l* through T*n* connected thereto, such as a particular potential level. In the case of telephone equipment units, for example, the seizure for use indication is typically ground potential extended by a relay contact closure. The embodiment in FIGS. 1 and 2 functions to detect the presence of seizure for use indications at the data gathering points and to record manifestations thereof in data store 260. The recorded manifestations are accumulated for predetermined periods of time, and, upon request, are encoded for transmission via output circuit 298 in a form suitable for subsequent processing by automatic data processing equipment.

In operation, data gathering points T*l* through T*n* are periodically scanned, one at a time, by scanner 110 under control of successive outputs of word counter 140 over path 115. Individual seizure for use indications appearing at points T*l* through T*n* are detected by scanner 110 and are extended serially over path 111 through delay 120 to the logic circuitry. The indications appearing on path 111 may be accumulated and recorded as peg count data, or as usage data, under the control of selection circuit 155. Peg count gate 156 is enabled over peg count lead PC by selection circuit 155 for peg count data recording, and usage gate 158 is enabled over usage lead US for usage data recording. Selection circuit 155 may comprise any readily programmable arrangement, such as a strapping or jack panel, for providing an output selectively on lead PC or on lead US in accordance with the individual outputs of word counter 140.

Moreover, as will be described in detail below, usage data may be accumulated and recorded with respect to individual equipment units connected to points T*l* through T*n*, as well as with respect to multipled groups of units connected to the data gathering points. During scanning of each point at which multipled group usage data is to be collected, selection circuit 155 provides an output on multipled usage lead MUS. Substantially unlimited input multipling flexibility is thus provided.

Data store 260 comprises a recirculating shift register, illustratively shown as including a main register 261 and an access register 262, having a total storage capacity of $2n + 2$ multibit words. Thus, data store 260 includes capacity for a dynamic memory word corresponding to each of data gathering points T*l* through T*n*, for a static memory word corresponding to each point T*l* through T*n*, and for two error checking words. According to the invention, the static and dynamic memories are interleaved on a word basis in store 260 with each pair of adjacent words corresponding to a respective data gathering point, the static memory word preceding the dynamic memory word in each pair. The dynamic memory words, herein referred to as "add" words, permit the accumulation of data during each current scanning cycle; while the static memory words, herein referred to as "send" words, permit the readout and transmission of a previously accumulated period of data.

Access to data store 260 is provided by access register 262, the capacity of which is a single multibit word. In addition to the serial connection of register 262 in the recirculating loop with main register 261, provision is made for the parallel loading and unloading of access register 262 via paths 266 and 268, respectively. Access register 262 may be loaded over path 266 with a data word from adder 250, or with a check word from generator 281 in error detection and correction circuit 280, loading being controlled via a load signal on lead LAR from timing pulse generator 232. Parallel unloading of access register 262 is effected over path 268 selectively to adder 250 for data word incrementing, to comparator 282 for error detection purposes, or to transmit buffer 290 for transmission. Access register 262 is reset via a reset signal on lead RAR from pulse generator 232.

As mentioned above, peg count data is obtained by comparing the current status of a data gathering point with the previous status thereof. When a previously idle equipment unit connected to a data gathering point is seized for use, the corresponding add word in store 260 is incremented by a count of one via adder 250. The previous status is stored in a last look memory which, according to an important aspect of the present invention, is provided as a part of the send and add word pair corresponding to the particular data gathering point, thereby minimizing the logic circuitry required on a per point basis.

Further, the last look memory is employed advantageously in the present invention for input filtering. Thus, to insure that an indication at a data gathering point is a valid seizure for use input and to insure that it is counted only once, the indication must persist at the point for a plurality of successive scans. For example, assuming herein a scanning rate of 6.7 milliseconds and a minimum duration of somewhat greater than 20 milliseconds for a seizure for use indication, persistence of an indication at a data gathering point for three successive scans is required to establish a valid input to be counted. Consequently, instead of comparing current scan with only a single previous scan, it is compare with the combined results of the three immediately previous scans before incrementing the corresponding add word. Illustratively, therefore, the last look memory includes two bits, comprising the highest order bit of the add word and the highest order bit of the send word, depicted for one word pair by the shaded bit locations in main register 261 and access register 262 in FIG. 2.

The two last look memory bits are accessible over leads LL1 and LL2 during the scan of the point to which they pertain since, as described below, the send and add word pair reside at that time in register 262 and in the last data word location in register 261, respectively. During the scan of each data gathering point, therefore, the last look bits ir he corresponding data word pair are extended over leaʌls LL1 and LL2 to last look register 130 for comparison with the current status of the point.

Figure 4:
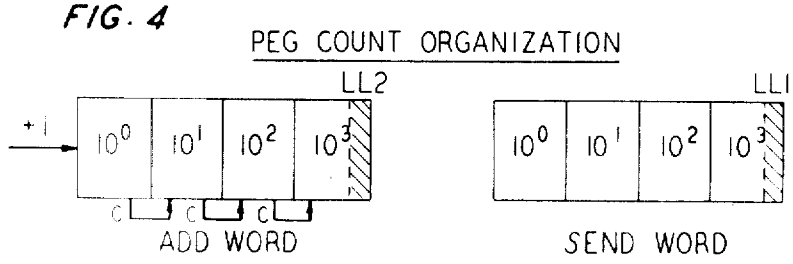
FIG. 4 depicts the peg count word organization illustratively employed in the embodiment of FIGS. 1 and 2.

For purposes of description, it is assumed in the illustrative embodiment that the send and add words each include four binary-coded-decimal digits. Since the highest order bit of each word is used as a last look memory bit, the most significant digit of each word includes only three bits, limiting the maximum count that may be accumulated in a data word to 7999. The organization of a send and add word pair for peg count accumulation is depicted in FIG. 4. When the send word is in access register 262, the 15 data bits of the previous period of accumulation may be unloaded over path 268 to transmit buffer 290, for transmission thereof via output circuit 298. The 16th bit, that is the last look bit in the send word, is extended over lead LL1 to the send cell of last look register 130. At the same time, the last look bit in the add word in main register 261 is extended over lead LL2 to the add cell of register 130.

Figure 3:
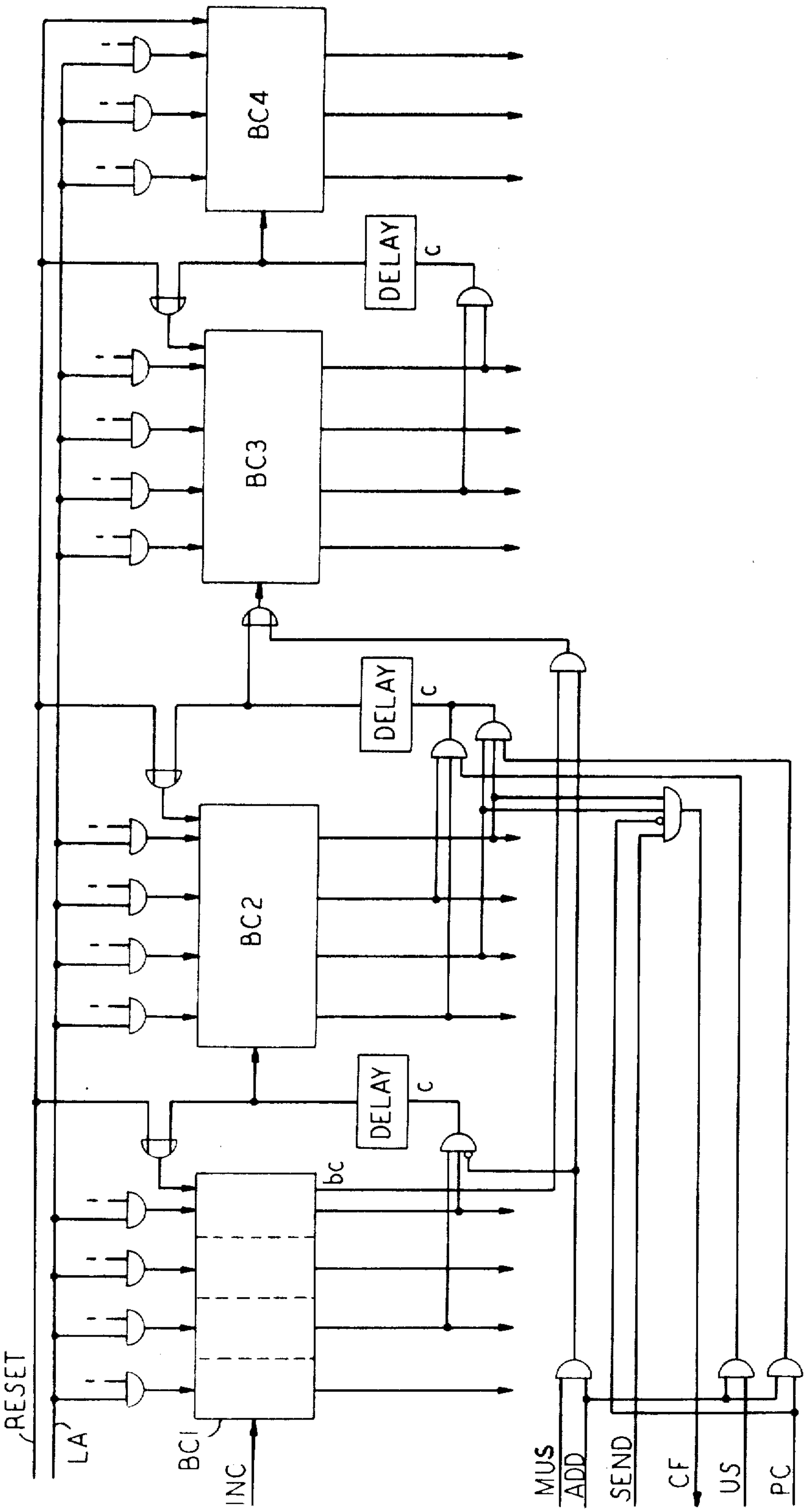
FIG. 3 is an additional block diagram showing the adder portion of FIG. 2 in greater detail.

Thereafter, when the add word is in access register 262, the data bits thereof may be unloaded over path 268 to adder 250 for incrementing the data if a valid input indication is present on lead 111. For incrementing peg count and usage data words, adder 250 is arranged as a four-stage decade counter, as shown in greater detail in FIG. 3, with the incrementing input applied to the first ($10^0$) stage BC1, and with the input to each successive stage BC2, BC3, BC4, being the carry output *c* from the preceding stage.

Figure 5:
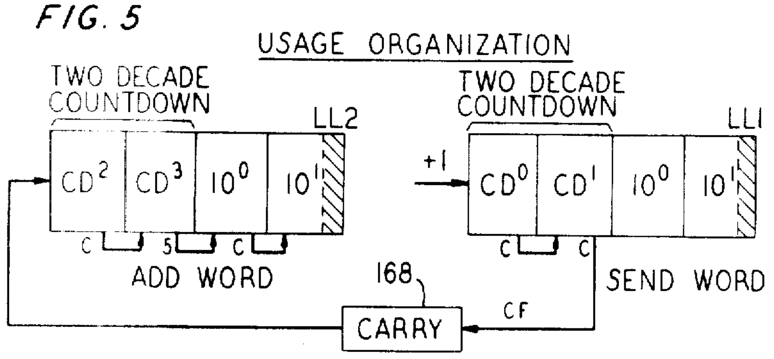
FIG. 5 depicts the usage data word organization illustratively employed therein.

The organization of a send and add word pair for usage accumulation is depicted in FIG. 5. The maximum usage count that can occur in the usual half-hour or 1-hour accumulation period, assuming CCS units, is 18 or 36, respectively. Thus, only two digits of each word are required for accumulating usage data. However, with the illustrative scan rate of 6.7 milliseconds assumed herein, and with the requirement for three successive scan appearances before an indication is considered valid, usage indications can appear at a data gathering point as frequently as on the order of every 20 milliseconds. This corresponds to a scan rate on the order of 5,000 times the standard 100 second rate for CCS usage units.

Accordingly, the usage indications directed to adder 250 are first scaled down, before incrementing the usage data in the add word, by employing the normally unused first two digits of the add and send words for four decade countdown. When a send word is in access register 262, it is unloaded into adder 250 for incrementing the first ($CD^0$) decade countdown stage if a valid usage input indication is present on lead 111. The carry output of the second ($CD^1$) countdown stage is directed to a carry fliP-flop 168 over lead CF. Subsequently, when the add word is unloaded into adder 250, the output of flip-flop 168 is extended to the input of the third ($CD^2$) countdown stage, that is the first digit position of the add word. The carry output thereof increments the fourth ($CD^3$) countdown stage and, in the illustrative embodiment herein, the digit "5" output of the fourth stage increments the usage data portion of the add word. Alternatively, usage data may be accumulated in alternate scan CCS units by using the normal carry output of the fourth countdown stage to increment the usage data, thereby providing a scaling factor of 10,000.

With the above description in mind, consider now the operation of the embodiment of FIGS. 1 and 2 in collecting and accumulating peg count and usage data pertaining to equipment units connected to data gathering points *Tl* through *Tn*. The periods during which data is to be accumulated are determined by timing circuit 230 which includes a conventional timer 236. For example, assume that data is to be accumulated starting at a particular time and extending for successive one-half hour periods. When the particular starting time arrives, timer 236 connects power to the system, resets adder 250 over lead 237 through OR gate 239 and, through OR gate 221 over lead RST, resets peg count and carry flip-flops 166 and 168 and, last look register 130. The signal on lead 237 is also extended through OR gate 222 over lead WCR to reset word counter 140. This initializes the system to begin a scanning period.

Scanning of points T*l* through T*n* by scanner 110 is controlled by the sequence of corresponding outputs *l* through *n* of word counter 140 over path 115. Scan cycle timing is via clock signals extended by clock 145 through gate 141, illustratively at a clock rate of 40 kHz. Word counter 140 responds to two successive clock signals from clock 145 to advance to the next word counter output and, therefore, to advance scanner 110 to the next data gathering point. Responsive to the first of the pair of clock signals, word counter 140 enables send word lead SEND; and responsive to the second clock signal, word counter 140 enables add word lead ADD.

Each clock signal from clock 145 is also extended over lead SS to counter 233 and to monopulser 235. Responsive thereto, monopulser 235 resets adder 250 over lead ADR and counter 233 provides a sequence of 16 shift pulses to data store 260 over shift lead SH through OR gate 247. Each sequence of shift pulses on lead SH shifts the data in store 260 sixteen bits forward, placing the next data word in access register 262.

Following the 16th shift pulse in each sequence, counter 233 enables timing pulse generator 232. Depending upon whether an add word or a send word is in access register 262, as indicated by the enabled one of leads ADD and SEND, pulse generator 232 provides an appropriate sequence of timing signals. If a send word, generator 232 provides a reset signal on lead RTB to transmit buffer 290, followed by a load signal on lead LTB. The signals on leads RTB and LTB reset transmit buffer 290 and unload the send word in access register 262 over path 268 into transmit buffer 290, provided the transmission of any previous send word in buffer 290 has been completed. If an add word is in access register 262, generator 232 provides a signal on lead LA to unload the add word into adder 250, followed by a scan signal on lead SP to enable gate 171, thereby extending the output of peg count flip-flop 166 over lead INC to increment the add word in adder 150 if flip-flop 166 is set. Generator 232 then provides a signal on lead RAR to reset access register 262, followed by a signal on lead LAR to load the contents of adder 250 back into access register 262 over path 266. The timing signal on lead LAR is extended also through gate 241 (enabled over lead ADL by the signal on lead ADD), through OR gate 221 to lead RST, thereby resetting flip-flops 166 and 168 and register 130.

Assume then, that the particular data gathering point being scanned is arranged for peg count data accumulation, as indicated by a signal on lead PC from selection circuit 155, and that a seizure for use indication is detected at the point and is extended over lead 111. Delay 120 ensures that the last look memory bits for the particular point are loaded into register 130 before the indication on lead 111 is directed to gate 121. If the last look memory is other than "11," the seizure for use indication is extended through gate 121 to increment the last look memory in register 130. When the last look memory reaches "11," that is, when the seizure for use indication is detected at the particular data gathering point for three successive scans, the output of register 130 through gate 131 enables monopulser 132 and inhibits gate 121 over lead INH. Monopulser 132 directs a pulse through peg count gate 156, enabled by the signal on lead PC, to set peg count flip-flop 166. After the last look memory has been incremented and while the send word is still in access register 262, the last look bit in the send cell of register 130 is loaded back into the send word over lead LD via gate 135, enabled by a signal on lead GL from generator 132.

Responsive to the next clock signal over lead SS, the add word of the pair is shifted into access register 262 and unloaded into adder 250 in the manner described above. The scan signal on lead SP enables gate 171 to extend the set output of peg count flip-flop 166 through OR gate 173 over lead INC to increment the add word in adder 250. At the same time as the incremented data is loaded back into access register 262, via the timing signal on lead LAR, the last look bit in the add cell of register 130 is loaded back into the add word over lead LD via gate 133, enabled by generator 132 over lead GL. As mentioned above, the signal on lead LAR is also extended through gate 241 over lead RST to reset register 130, delay 183 ensuring that the last look bits are unloaded before register 130 is reset.

Since peg count data represents the number of seizures in a given interval, each seizure must be counted only once. Thus, as mentioned above, upon the last look memory reaching "11" to indicate a valid peg count input, the output of register 130 through gate 131 over lead INH inhibits gate 121 to prevent further counting of the input during subsequent scans. When, during a subsequent scan, the seizure for use indication no longer appears at the particular data gathering point (due to the release of the equipment connected thereto), the absence of the indication is reflected through inverter 123 to reset the last look memory in register 130. This removes the inhibit signal from gate 121, permitting a new peg count to be made when a new seizure for use indication is detected at the data gathering point during later scans.

Usage data is accumulated in a similar manner. However, since usage data represents use duration, each valid seizure for use input must be counted. Thus, during usage data accumulation, upon the last look memory reaching "11" for a data gathering point, it is reset for a new usage detection cycle. For this purpose, the output signal from the monopulser 132 is directed through usage gate 158, OR gate 185 and delay 183 to reset the last look memory. The signal through usage gate 158 is also extended through OR gate 173 over lead INC to increment usage countdown stage $CD^0$ in the send word in adder 250. Thus, whereas peg count data is incremented only once per each seizure for use, usage data countdown is incremented as often as every three scanning cycles for as long as the seizure for use indication persists at the data gathering point.

Figure 6:
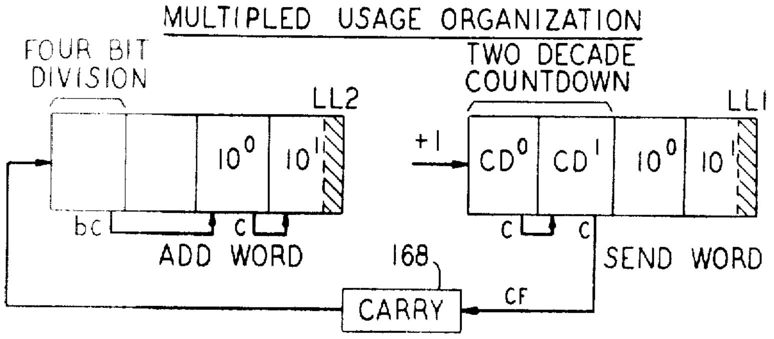
FIG. 6 depicts the multipled usage word organization illustratively employed.
Figure 7:
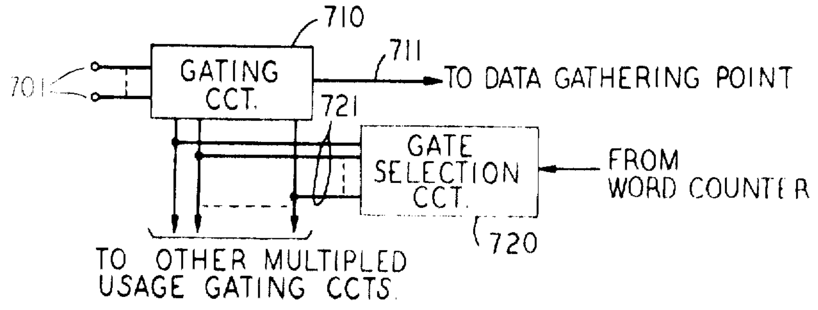
FIG. 7 is a block diagram of an illustrative arrangement for multipling data inputs to obtain multipled usage data.

As mentioned above, pluralities of equipment units may be multipled to individual ones of data gathering points T*l* through T*n* for collecting multipled usage data. The word organization for multipled usage data accumulation is depicted in FIG. 6 and an illustrative arrangement for multipling inputs is shown in FIG. 7. The multipled usage word organization is similar to that employed for normal usage data accumulation, except that the multipled usage indications are scaled down by a different amount before a data count is made. Illustratively, multipled usage indications may be scaled down, for example, by 1,600 rather than the 5,000 scale-down employed for normal usage accumulation.

This can be achieved advantageously, as depicted in FIG. 6, by using the first digit of the add word for four bit division along with the two decade countdown provided in the send word. The carry output of the second decade countdown stage in the send word is employed, via flip-flop 168, to increment the four bit division stage of the add word. Upon reaching a count of 16, the binary carry output *bc* of the later stage is extended around the second stage of the add word to increment the multipled usage data count.

As shown in the illustrative arrangement in FIG. 7, input terminals 701 of gating circuit 710 may be connected to the respective equipment units to be multipled for usage data collection, and the output of gating circuit 710 is extended over path 711 to one of data gathering points T*l* through T*n*. Individual ones of input terminals 701 are connected to path 711 in succession by gating circuit 710 under control of signals on leads 721 from gate selection circuit 720, each terminal being connected to path 711 for three successive scans in its turn. The effective multipled usage scanning rate, therefore, is the normal scanning rate divided by the number of multipled terminals 701. However, it will be recalled that the normal scanning rate is 5,000 times the rate required for CCS units, thus permitting substantially unlimited input multiplying flexibility. The maximum count that may be accumulated in a multipled usage data word is determined, of course, by the scaling factor (illustratively 1,600 above) which may be fixed in accordance with the largest multipled group anticipated or which may be varied according to group sizes. Other multipled usage gating circuits may be controlled in a similar manner by the signals on leads 721 from selection circuit 720.

At the end of a data gathering period, as determined by timer 236, a signal on lead 237 initializes the system in the manner described above and a new period starts with the next clock signal from clock 145. The first scanning cycle of the new period is dedicated to rearranging data store 260 to convert the add words of the previous period into send words for the new period, maintaining the relationship of the send word preceding the add word in each data word pair. As the first data word (a previous send word) is shifted into access register 262 during the first scan cycle, no action is taken. As the second data word (an add word) is shifted into register 262, timer 236 provides a reset signal over lead WCR to reset word counter 140. With the word counter reset, the word in register 262 is now considered the first data word, that is, a send word. For the remainder of this first scan cycle, all send words (add words of the previous period) are treated in the normal manner. All add words (previous send words), however, must be reset for the new period of data accumulation. Thus, as each add word is shifted into access register 262 and unloaded into adder 250 during this first cycle, it is reset by timing circuit 230 over adder reset lead ADR before being loaded back into access register 262. Normal data accumulation begins with the start of the second scan cycle initiated by word counter 140.

At any point during a current period of accumulation, the data accumulated during the previous period can be read out for transmission by output circuit 298, such as in response to polling from a central processing location. As described above, during each scan cycle the send words are unloaded in turn from access register 262 into transmit buffer 290, responsive to signals over lead LTB from pulse generator 232. If a data word in buffer 290 is to be transmitted, it is converted into a suitable code, typically USASCII code, by translator 292 and is directed to output circuit 298 for transmission. Output circuit 298 may include a conventional data set for this purpose. Output circuit 298 may also include a character generator 296 which, via translator 292, provides suitable header and trailer characters for the data being transmitted.

It will be appreciated, of course, that add words in data store 260 also may be read out for real time transmission, if desired. For example, in response to a request for transmission of the add words, output circuit 298 extends a signal over lead 297, causing pulse generator 232 to provide a timing signal on lead LTB when each add word is in access register 262.

Detection and correction circuit 280 is provided in accordance with one aspect of the invention to minimize erroneous data which may arise due to loss of correspondence between the word locations in data store 260 and the points T*l* through T*n* being scanned. A single data word pair in store 260 is dedicated to a checking sequence comprised of otherwise illegal data characters, e.g., any of the binary coded numbers 11 through 15. The checking sequence is loaded into the dedicated data word pair by check word generator 281 at the beginning of each period of data accumulation. Thereafter, during each scan cycle, when word counter 140 indicates via check lead CK that one or the other of the check words is in access register 262, the word is compared in comparator 282 to insure the proper bit sequence. If correct, operation continues in the normal manner. However, should a mismatch occur, data store 260 is shifted on an incremental basis under control of circuit 280 over lead ICR through OR gate 247 until correct correspondence with the scanning is achieved, that is, until the word in access register 262 matches the appropriate checking sequence. During incremental shifting, the clock signals are prevented from advancing word counter 140 via an inhibit signal extended to gate 141 over lead CC from circuit 280. If desired, an indication and/or count of errors detected may be provided by circuit 280 in any conventional manner.

It is to be understood that the above-described arrangements are merely illustrative of the principles of the invention. Numerous and varied other arrangements in accordance with these principles may readily be devised by those skilled in the art without departing from the spirit and scope of the invention.

What is claimed is:

1. In a device for gathering data pertaining to the status of each of a plurality of inputs, the combination comprising, means for scanning said inputs in succession, memory means comprising a plurality of memory locations individually corresponding to respective ones of said inputs, said memory locations each being adapted for storing two multibit data words pertaining to the corresponding one of said inputs, means including a portion of at least one of said multibit data words at each of said memory locations for comparing the status of corresponding ones of said inputs during a current scan with the status thereof during the immediately preceding scan, and means responsive to said comparing means for storing and accumulating data pertaining to a predetermined change in status at one of said inputs in the corresponding one of said memory locations.

2. The combination according to claim 1 wherein said memory means comprises a first memory including one of said multibit data words at each of said memory locations and a second memory including the other of said multibit data words at each of said memory locations, with the words of said first and second memories being interleaved.

3. The combination according to claim 2 wherein said comparing means includes a portion of the data words of both of said first and second memories at each of said memory locations.

4. The combination according to claim 1 wherein said comparing means includes means for comparing the status of individual ones of said inputs during a current scan with the status thereof during a predetermined plurality of immediately preceding scans, and wherein said storing and accumulating means includes means for accumulating said data pertaining to one of said inputs only in response to the status of said one input remaining in a particular state for said predetermined plurality of scans.

5. The combination according to claim 1 wherein said storing and accumulating means comprises usage data means for adapting a portion of individual ones of said multibit data words for counting the presence of a particular state at corresponding ones of said inputs for a predetermined plurality of successive scans before accumulating data pertaining to said corresponding ones of said inputs.

6. The combination according to claim 5 further comprising means for varying said predetermined plurality of successive scans.

7. The combination according to claim 1 further comprising an additional memory location in said memory means for storing a sequence of check bits, and means including said additional memory location operative periodically for detecting and correcting any loss of correspondence between the inputs being scanned by said scanning means and the memory locations in which data pertaining to said inputs is being accumulated.

8. Apparatus for gathering traffic data pertaining to a plurality of equipment units comprising, scanning means having a plurality of inputs for coupling to individual ones of said equipment units, memory means including first and second memories each having respective data word locations associated with individual ones of said inputs, adder means including circuitry normally operative with said scanning means for storing and accumulating peg count data pertaining to individual ones of said equipment units in said data word locations in a selected one of said memories, means for modifying the operation of said adder means to use a portion of the first and second memory data word locations associated with a particular one of said inputs as counting means, and means operative with said modifying means for storing and accumulating usage data pertaining to an equipment unit coupled to said particular input in the remainder of said associated data word location in said selected one of said memories.

9. Apparatus according to claim 8 wherein said adder means comprises means for using a portion of each of said data word locations in at least one of said first and second memories as a last look memory for comparing the status of equipment units coupled to individual ones of said inputs during a current scan with the status thereof during a predetermined plurality of immediately preceding scans.

10. Apparatus according to claim 9 wherein said last look memory comprises at least one bit location in each data word location of said first and second memories.

11. Apparatus according to claim 8 wherein said memory means comprises a recirculating memory having the data word locations of said first memory interleaved with the data word locations of said second memory, said respective first and second memory data word locations associated with an individual input being immediately adjacent to one another.

* * * * *